INVENTOR
KENNETH T. MacMILLAN

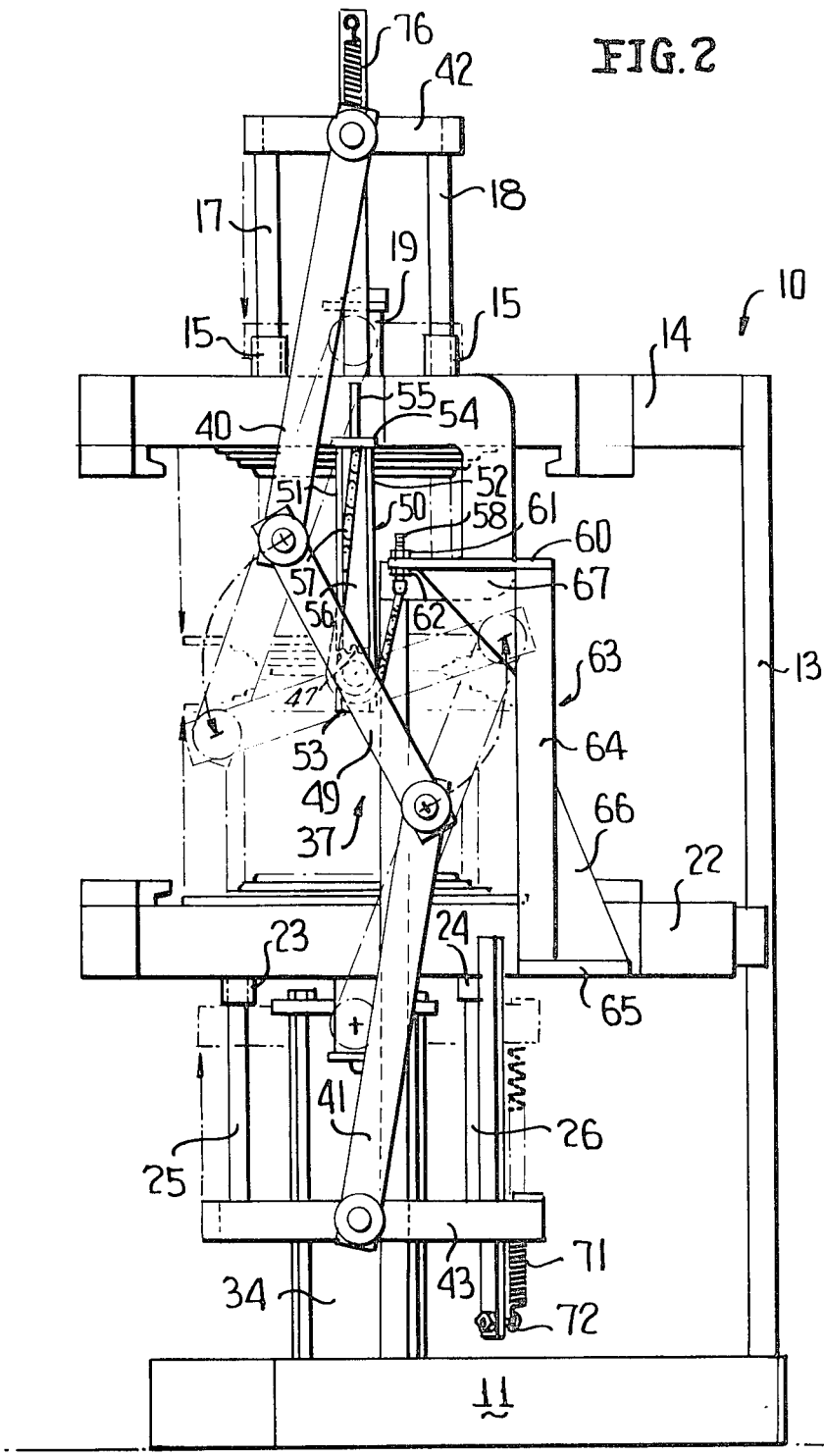

United States Patent Office 3,609,813
Patented Oct. 5, 1971

3,609,813
BEAD ALIGNER CENTERING DEVICE
Kenneth T. MacMillan, Macon, Ga., assignor to
MacMillan Mold Company Inc., Macon, Ga.
Filed Oct. 30, 1969, Ser. No. 872,649
Int. Cl. B29h *5/04*
U.S. Cl. 18—18 F                                13 Claims

ABSTRACT OF THE DISCLOSURE

This disclosure relates to an apparatus for assuring the exact position of a tire within a recap mold of the type including a matrix and oppositely opposed movable bead aligner wheels. The bead aligner wheels are connected by a pair of linkages, each of which includes a centermost link carrying a sprocket guided for movement along a path parallel to the bead aligner wheels. Each sprocket is entrained by a chain having ends connected to respective fixed and movable portions of the apparatus such that upon relative movement of the bead aligner wheels toward or away from each other the sprockets remain midway between the bead aligner wheels whereby a tire therebetween will be positioned exactly centrally of the matrix to assure that the center of the new tread will be at the center of the tire as measured from both beads.

---

In the molding of a tread on a tire, the tire is placed within a matrix and is inflated by means of a curing tube placed therein. During the curing of the tread of the tire, it is essential that the beads of the tire be properly centered in order that the center of the new tread will the at the center of the tire as measured from both of the tire beads. In order to accomplish this, tire treading mechanisms are conventionally provided with bead aligners or bead aligner wheels which are positioned in opposed relationship, and are normally carried by fluid cylinders which are simultaneously actuated from a common pressurized fluid source. However, various factors ofttimes preclude accurate centering even under optimum operation of conventional molds.

One main reason for the difficulty in accurately centering a tire in a matrix is the fact that in horizontal molds the bottom bead aligner cylinder supports the weight of the tire, the curing tube, and the inside curing rim, thereby causing the top bead aligner cylinder to, in effect, have more power which is additionally augmented by the force of gravity. For this reason, the majority of tires, with everything else being equal, are inserted too far down into the bottom half of the matrix with the result that the center of the new tread is not coincident with the center of the tire.

In addition, not all tires have beads of equal resistance to movement with the result that the weakest bead of a tire is moved further than the stronger bead thereof which likewise contributes to the centering problem.

Also, should the top bead aligner cylinders for some reason, such as a leaking piston, lose some of their force, then the tire will be forced too far up into the top half of the matrix throwing the centerline of the tread upwardly off the centerline of the tire.

Another factor contributing to the offcentering of tires within matrices is the fact that most molding machines must be capable of being loaded with matrices of varying widths. For instance, matrices of a particular mold or press may vary from 7 inches in width to 11 inches in width with the possibility of even increasing the latter dimension through the use of spacer rings. While a mold may operate relatively satisfactorily and repetitively for a 7-inch matrix, the additional weight of larger size matrices increases the probability of off-centering between the tire and the matrices, particularly in a direction such that the tire will be inserted too far into the bottom half of the matrix because of the effect of gravity on the heavier larger tires which opposes the force of the lower bead aligner cylinders while augmenting the force of the upper bead aligner cylinders.

It is, therefore, a primary object of this invention to provide a novel centering apparatus which positively assures that each tire will be positioned in a matrix exactly on center horizontally, that is, the center of the new tread will be coincident with the center of the tire as measured from both of the tire beads.

A further object of this invention is to provide a novel centering apparatus of the type referred to wherein mechanical means are coupled between opposed bead aligner wheels for maintaining each bead aligner wheel spaced the same distance from the centerpoint between the aligner wheels during the movement of the same toward and/or away from each other.

A further object of this invention is to provide a novel centering apparatus of the type immediately heretofore defined wherein there is provided stationary support means and movable support means for respectively supporting first and second opposed bead aligner wheels, flexible means between the stationary and movable support means, and a mechanical means including means movably coupling the flexible means to a linkage assembly connected between the bead aligner wheels whereby upon movement of the bead aligner wheels and the movable support means the coupling means moves relative to the flexible means to maintain each bead aligner wheel at the midpoint of the distance therebetween.

A further object of this invention is to provide a novel bead aligner apparatus wherein the flexible means is a sprocket chain, and the coupling means includes a sprocket partially entrained by the sprocket chain and being guided for movement along a path parallel to the direction of movement of the bead aligner wheels.

With the above and other objects in view that will hereinafter appear, the nature of the invention will be more clearly understood by reference to the following detailed description, the appended claimed subject matter, and the several views illustrated in the accompanying drawings.

In the drawings:

FIG. 2 is a side elevational view of the apparatus of FIG. 1, and more clearly illustrates the construction of one of the two identical linkage systems and the manner in which the same is connected to the bead aligner wheels.

Figure 1:
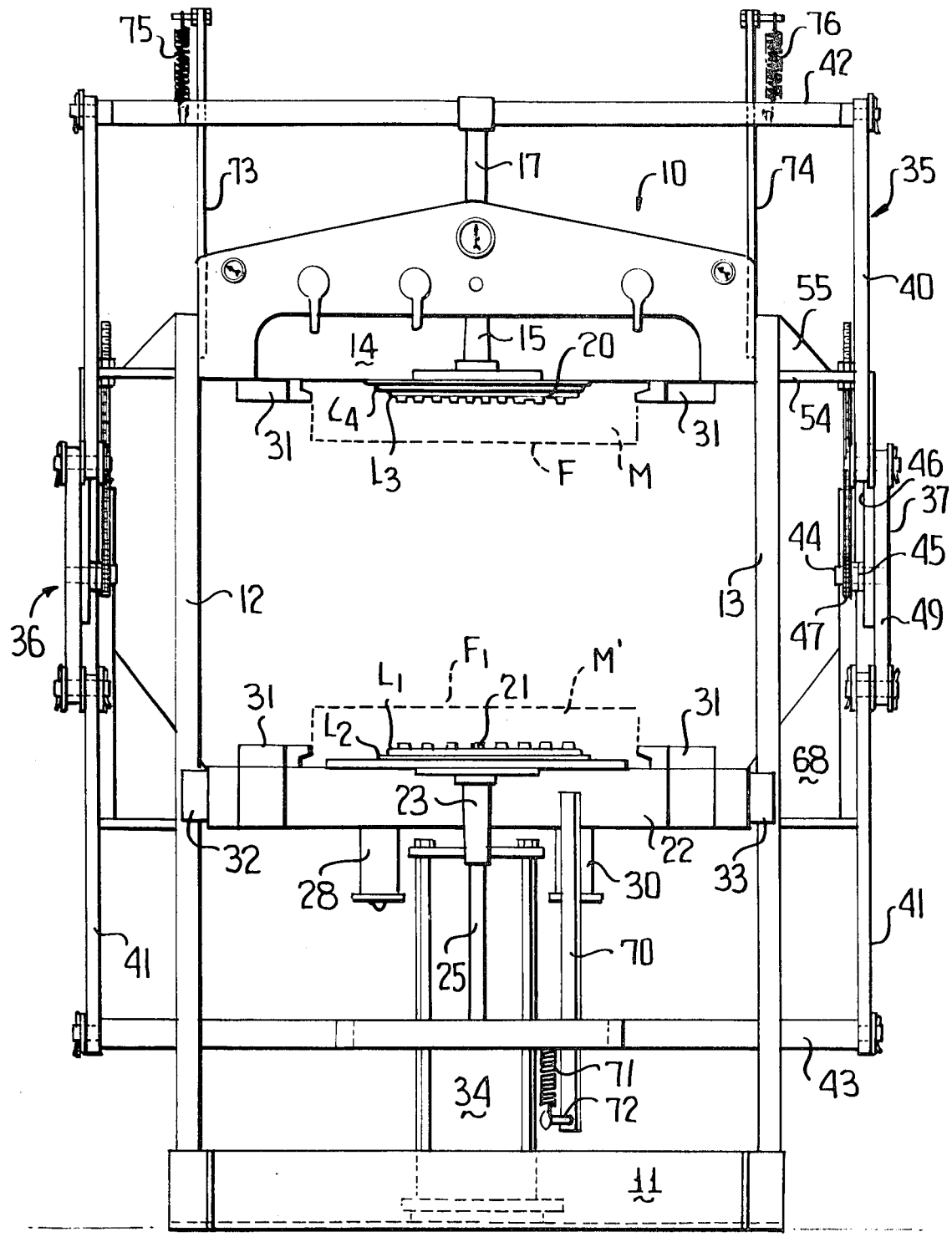
FIG. 1 is a front elevational view of the novel bead aligner mechanism of this invention in conjunction with a molding machine, and illustrates an identical linkage system on each side of the mold connected between opposed relatively movable bead aligner wheels.

A recapping mold, generally designated by the reference numeral 10 includes a base 11 and a pair of upstanding side rails 12, 13 to the upper ends of which is welded or otherwise conventionally secured an upper frame member 14. The upper frame member 14 has secured at each of the front and rear faces thereof a pair of tubular guides 15, 16 in which are slidably received respective guide pins 17, 18. The guide pins 17, 18 are fixedly secured to an upper bead aligner wheel 20. The bead aligner wheel 20 is moved axially relative to the upper support 14 by means of a fluid cylinder 19 carried by the upper support 14 having a piston rod (not shown) connected to the bead aligner wheel 20. Upon the introduction of fluid into the cylinder 19 from a conventional source (not shown), the piston rod moves downwardly to move the bead aligner wheel 20 in a like direction, while the introduction of fluid into the cylinder 19 at the rod end results in opposite movement of the bead aligner wheel 20. Though not specifically disclosed herein, apparatus for imparting movement to the bead aligner wheel 20 and to an opposite bead aligner wheel 21 may correspond to that disclosed in Pat. No. 3,309,737 entitled "Tire Mold Bead Aligning Apparatus" issued on Mar. 21, 1967, in the name of Donald M. MacMillan.

The lower bead aligner wheel 21 is likewise mounted for sliding movement relative to a movable support member 22 by means of a pair of tubular guides 23, 24 (FIG. 2) in which are slidably received guide pins 25, 26, respectively. The guide pins 25, 26 are likewise fixed at their upper ends to the bead aligner wheel 21. The bead aligner wheel 21 is moved toward and away from the bead aligner wheel 20 by means of a pair of bead aligner cylinders 28, 30 (FIG. 1) each having a piston rod (not shown) whose upper end is fixedly connected to the bead aligner wheel 21. As in the case of the cylinder 19, hydraulic fluid is introduced into and withdrawn from the cylinders 28, 30 to move the bead aligner wheel 21 toward and away from the bead aligner wheel 20 in synchronism therewith. Though not specifically described herein, the hydraulic system for so operating the bead aligner wheels 20, 21, may, as heretofore noted, be of the type heretofore mentioned in the foregoing patent.

A matrix (not shown) is secured to the supports 14, 22 by conventional matrix clamps 31, and conventional means (not shown) may be provided for attaching matrices of different sizes to each of the supports 14, 22. The support 22 is, unlike the support 14, mounted for reciprocal movement upon the side rails 12, 13. The support 22 includes a pair of generally U-shaped brackets 32, 33 which provide guidance as the support 22 is moved upwardly or downwardly. Movement is imparted to the support 22 by means of a main cylinder 34 having a piston rod (not shown) fixedly connected to the support 22 in a conventional manner. Reference is made to the latter-noted patent for the specifics of the hydraulic system for operating the cylinder 34 to impart reciprocal motion to the support 22.

A centering device, generally designated by the reference numeral 35, includes two identical linkage mechanisms 36, 37, the latter of which will be described hereinafter in detail which will suffice for a complete understanding of the linkage mechanism 36.

The linkage mechanism 37 includes a pair of links 40, 41 which are respectively pivotally connected at ends thereof to upper and lower platens 42, 43. The opposite ends of the links 40, 41 are connected to a center link 49 having fixedly secured to its midpoint a stub shaft 44. A rectangular or square guide block 45 (FIG. 1) is positioned on the shaft 44 between an inner surface 46 of the center link 49 and a sprocket 47. The sprocket 47 is not keyed to the shaft 45 but is mounted in such a manner as to permit the sprocket 47 to freely rotate relative to the shaft 45.

The block 45 is mounted for vertical sliding movement in guide means, generally designated by the reference numeral 50. The guide means 50 is defined by a pair of plates 51, 52 connected together at their lower ends by a plate 53 and their upper ends by a plate 54 which is welded to the support 14. A triangular bracket 55 is likewise welded to the support 14 and the plate 54 to reinforce the latter, in the manner best illustrated in FIG. 1. The plates 51, 52 thereby define an elongated generally rectangular slot 56 whose longitudinal center line is in coincidence with the aligned axes of the bead aligner wheels 20, 21.

Flexible means in the form of a sprocket chain 57 is partially entrained about the sprocket 47 and has one end thereof conventionally secured to the bracket 54 and an opposite end connected to a bolt 58 passing through an aperture (unnumbered) of a plate 60. A pair of nuts 61, 62 on opposite sides of the plate 60 allow the bolt 58 to be adjusted to adjust the position of the sprocket 47 between the bead aligner wheels 20, 21 in a manner and for a purpose to be described hereinafter.

The plate 60 is part of a generally Z-shaped upstanding bracket 63 which includes a vertical plate 64 and a horizontal plate 65, the latter of which is welded or otherwise conventionally secured to the movable support 22. A plurality of triangular reinforcing plates 66, 67 and 68 (FIG. 1) are provided to reinforce the Z-shaped member 63 in a conventional manner.

As best shown in FIG. 2, the upper ends of the guide pins 17, 18 are conventionally fixedly secured to the platen 42 while the lower ends of the guide pins 25, 26, are likewise secured to the lower platen 43. In addition, a rod 70 (FIG. 1) has its upper end welded to the movable support 22 and its lower end connected to a tension spring 71 by means of a bolt 72. The upper end of the spring 71 is fixedly connected to the platen 43. A pair of plates 73, 74 are likewise welded to the fixed support 14 and respective tension springs 75, 76 are connected between the plates 73, 74 and the upper platen 42. The springs 71, 75 and 76 function to assure that the linkage means 36, 37 are always in tension.

The centering mechanism 35 operates on two basic mechanical principles:

First is that if two movable points are connected by a straight line, the center of this line will always stay equidistant from the two points when either one or both of the points are moved toward or away from one another.

Secondly, a center point of a sprocket or pulley when riding on a flexible connecting member, such as a chain, rope or similar element, connecting two different points, one stationary and one movable, will always move at one-half the rate of the moving point.

In keeping with the latter principle, if the center point is midway between two points, it will always remain equidistant from the two points even though the two points move toward or away from one another.

Assuming that the movable support 22 is in its lowermost position, as illustrated in FIGS. 1 and 2, and that the bead aligner wheels 20, 21 are fully retracted, as shown, the sprockets 47 of both linkage mechanisms 36, 37 are positioned such that their axes are precisely at the midpoint of the distance between the bead aligner wheels 20, 21. This distance can, of course, be measured accurately and merely by loosening or tightening the nuts 61, 62 the sprocket 47 of either or both of the linkages 36, 37 can be adjusted and secured as found necessary.

As the support 22 moves upwardly under the influence of the hydraulic power of the cylinder 34, the chain 57 forces the sprockets 47 to move upwardly at one-half the rate of the movement of the support 22. At the same time the links 40, 41 and 49 connected between the platens 42, 43 prevent anything other than equidistant movement of the bead aligner wheels 20, 21 toward or away from each other under the influence of hydraulic pressure within the cylinders 19, 28 and 30. In this manner, as the blocks 45 guide the sprockets 47 of the linkage mechanism 36, 37 upwardly the sprockets move relative to the supports 14, 22 and the bead aligner wheels 20, 21 but during all such movement the axes of the sprockets 47 are at all times at a midpoint between the bead aligner wheels as well as between the supports 14, 22 themselves. Since the matrices (not shown) are clamped directly to the supports 14, 22, the mechanisms 36, 37 cause the center of the sprockets 47 to therefore at all times be at the center of the matrix during opening and closing movement, and when completely closed assure that the center of the new tread will be at the center of the tire recapped in the matrix.

As was stressed heretofore and as appears in subsequent claims, a major feature of the invention is the provision of means for maintaining each bead aligner wheel spaced the same distance from the center point between the aligner wheels at least during the movement of the aligner wheels toward each other which occurs during the movement of the movable support toward the next support. Though this fact has been stressed, of equal importance is that the bead aligner wheels move away from each other at the same time and at the same rate. For example, after the built-up tire has been inserted in the matrix the operator inflates the tire and then retracts the bead aligners. By inflating the tire with the bead aligner wheels in position, the tire expands to the matrix surface and is thereby locked in place. However, as can be appreciated, if one bead aligner retracts before the other, the tire would be pushed to one side by the last bead aligner ring to move. In view of this, the invention is equally important and the fact is stressed that the bead aligners move also away from each other at the same time and at the same rate.

Though reference has been further made to the fact that the sprockets 47, 47 are maintained with their axes at the exact center point between the bead aligner place and the top and bottom platens, it is not essential to have these sprockets at the center point. The location of the axes of the sprockets 47, 47 is relative and while it thus aids in describing the present invention the same is not limited to the center point position of the sprockets 47, 47 but rather to the fact that the mechanism is operative such that upon opening and closing of the bead aligner wheels 20, 21 a plane passing through the midpoint of the distance between the bead aligner wheels, or the various steps thereof, depending upon the size of the tires involved, passes through abutting faces of the matrices, as best shown in phantom outline in FIG. 1. Referring to FIG. 1, conventional annular matrices M, M' having respective annular opposing faces F, F' are clamped to the respective supports 14, 22 by the matrix clamps 31. Upon relative movement between the supports 14, 22 the faces F, F' are brought into abutting relationship and a plane through these faces F, F', which is horizontal in FIG. 1, is at all times spaced an identical distance from the bead aligner wheels 20, 21 due to the operation of the mechanisms 36, 37 heretofore described. For example, if a tire were positioned with its beads between the steps of the ledges $L^1$, $L^3$ in the closed position of the matrix M, M' the distance between the step $L^3$ and a plane through the faces F, F' is identical to the distance between a plane through the faces F, F' and the ledge $L^1$, irrespective of the degree of movement of the bead aligner wheels 20, 21 toward each other. Like identity of distance between the remaining steps $L^2$, $L^4$, etc. is effected by the mechanisms 36, 37 depending, of course, upon the particular size (diameterwise) tire which is being retreaded. Thus, in this manner it is assured that a plane passing through the midpoint of the distance between any of the aligned steps, $L^1$, $L^3$, for example, passes through the abutting faces F, F' of the matrix M, M'.

While the present invention is specifically directed to the linkage mechanisms 36, 37, specifically the links, the chain and sprocket thereof, it is to be understood that equivalent structure may be used to practice the invention. As an example, a pair of racks and a pinion may be employed to obtain the same relationship between the bead aligner wheels and the matrix bodies. As viewed in FIG. 2, the entire linkage mechanism could be removed and a vertical rack secured to the upper member 42 descending downwardly while another vertical rack could be secured to the member 43 ascending upwardy with the teeth of the racks in opposed relationship. The racks would be in mesh with a pinion therebetween, and upon movement imparted to the members 42, 43 a like relationship would take place between the bead aligner wheels and the abutting faces of the matrix bodies. The same result would, of course, occur if the racks were connected to the supports 14, 22.

While preferred forms and arrangements of parts have been shown in illustrating the invention, it is to be clearly understood that various changes in details and arrangements of parts may be made without departing from the spirit and scope of this disclosure.

I claim:

1. A bead aligner centering device comprising a pair of relatively movable supports, means for relatively moving said supports toward and away from each other, first and second bead aligner wheels movably carried by said supports toward and away from a centerpoint therebetween, and mechanical linkage means coupled to and between each bead aligner wheel and to and between said relatively movable supports for maintaining each bead aligner wheel spaced the same distance from said centerpoint between the aligner wheels as well as maintaining said supports the same distance from said centerpoint between the aligner wheels at least during the relative movement of said supports toward each other.

2. The bead aligner centering device as defined in claim 1 wherein said mechanical linkage means includes means for also moving the centerpoint to maintain a like distance between the same and each aligner wheel.

3. The bead aligner centering device as defined in claim 1 including flexible means between said pair of supports, and means movably coupling said flexible means to said linkage means at said centerpoint.

4. The bead aligner centering device as defined in claim 3 wherein said flexible means is a sprocket chain and said coupling means includes a sprocket partially entrained by said sprocket chain.

5. The bead aligner centering device as defined in claim 3 including means for adjusting the position of said coupling means relative to said flexible means to positively locate said centerpoint exactly midway between said aligner wheels.

6. The bead aligner centering device as defined in claim 3 including means for guiding said aligner wheels along a linear straight line path toward and away from each other, and means for guiding the movement of said coupling means along a path parallel to said straight line path.

7. The bead aligner centering device as defined in claim 3 wherein said linkage means includes first and second links connected at an end of each of said respective first and second aligner wheels, another link between and connected to the other ends of said first and second links, flexible means connected between one of said movable aligner wheels and one of said pair of supports, and means movably coupling said flexible means to said another link at said centerpoint whereby upon movement of said aligner wheels said coupling means moves relative to said flexible means to maintain each bead aligner wheel spaced the same distance from said centerpoint.

8. The bead aligner centering device as defined in claim 7 including means for guiding said aligner wheels along a linear straight line path toward and away from each other, and means for guiding the movement of said coupling means along a path parallel to said straight line path.

9. The bead aligner centering device as defined in claim 8 wherein said flexible means is a sprocket chain and said coupling means includes a sprocket partially entrained by said sprocket chain.

10. A bead aligner centering device comprising a pair of relatively movable supports, means for relatively moving said supports toward and away from each other, first and second bead aligner wheels movably carried by said supports toward and away from a centerpoint therebetween, and mechanical linkage means coupled to and between each bead aligner wheel and to and between said relatively movable supports for maintaining each bead aligner wheel spaced the same distance from said centerpoint between the aligner wheels as well as maintaining said supports the same distance from said centerpoint between the aligner wheels during the relative movement of said supports toward and away from each other.

11. The bead aligner centering device as defined in claim 10 wherein said mechanical linkage means includes means for also moving the centerpoint to maintain a like distance between the same and each aligner wheel.

12. The bead aligner centering device as defined in claim 10 including flexible means between said pair of supports, and means movably coupling said flexible means to said linkage means at said centerpoint.

13. The bead aligner centering device as defined in claim 10 wherein said mechanical linkage means includes means for also moving the centerpoint to maintain a like distance between the same and each aligner wheel, including flexible means between said pair of supports, and means movably coupling said flexible means to said linkage means at said centerpoint.

References Cited
UNITED STATES PATENTS

| | | | |
|---|---|---|---|
| 1,879,379 | 9/1932 | Macbeth | 18—17 W |
| 2,095,299 | 10/1937 | Thriveatt et al. | 18—17 E |
| 2,508,301 | 5/1950 | Stacy | 18—16 H |
| 2,692,407 | 10/1954 | Stacy | 18—16 H |
| 2,712,157 | 7/1955 | Holte | 25—90 X |
| 2,812,543 | 11/1957 | Stacy | 18—16 H |
| 2,844,858 | 7/1958 | Assmann | 25—90 X |
| 2,923,976 | 2/1960 | Strauss | 18—16 TX |
| 2,942,295 | 6/1960 | Duesksen et al. | 18—18 F |
| 2,962,788 | 12/1960 | Ramirez | 18—16 HX |
| 2,987,770 | 6/1961 | Powell | 18—18 F |
| 3,074,109 | 1/1963 | Duesksen | 18—18 F |
| 3,273,203 | 9/1966 | Ross | 18—19 F |
| 3,276,077 | 10/1966 | Cherrington | 18—16 H |
| 3,309,737 | 3/1967 | MacMillan | 18—18 F |
| 3,370,322 | 2/1968 | Nowicki | 18—5 BB |
| 2,233,354 | 2/1941 | Thilenius | 18—30 LT |

J. HOWARD FLINT, JR., Primary Examiner

U.S. Cl. X.R.

18—16 T, 30 LT; 100—269